United States Patent
Xu et al.

(10) Patent No.: US 11,960,088 B2
(45) Date of Patent: Apr. 16, 2024

(54) WAVEGUIDE CONFIGURATIONS IN A HEAD-MOUNTED DISPLAY (HMD) FOR IMPROVED FIELD OF VIEW (FOV)

(71) Applicant: Meta Platforms Technologies, LLC, Menlo Park, CA (US)

(72) Inventors: Miaomiao Xu, Redmond, WA (US); Brian Wheelwright, Sammamish, WA (US); Ying Geng, Bellevue, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 32 days.

(21) Appl. No.: 17/709,942

(22) Filed: Mar. 31, 2022

(65) Prior Publication Data

US 2022/0350149 A1 Nov. 3, 2022

Related U.S. Application Data

(60) Provisional application No. 63/180,972, filed on Apr. 28, 2021.

(51) Int. Cl.
*G02B 27/01* (2006.01)
*G06T 19/00* (2011.01)

(52) U.S. Cl.
CPC ........ *G02B 27/0172* (2013.01); *G06T 19/006* (2013.01); *G02B 2027/0187* (2013.01)

(58) Field of Classification Search
CPC ........ G02B 27/0172; G02B 2027/0187; G06T 19/006
See application file for complete search history.

(56) References Cited

U.S. PATENT DOCUMENTS

| | | | |
|---|---|---|---|
| 10,678,048 B1* | 6/2020 | Wheelwright | G02B 27/0081 |
| 10,914,956 B1* | 2/2021 | Trail | G02B 6/122 |
| 10,928,635 B1* | 2/2021 | Trail | G02B 6/0023 |
| 11,073,701 B2* | 7/2021 | Matsumura | G02B 27/022 |
| 11,281,010 B2* | 3/2022 | Blomstedt | G02B 27/4272 |
| 11,327,307 B2* | 5/2022 | Georgiou | G06F 3/011 |
| 11,385,465 B2* | 7/2022 | Muenz | G02B 5/18 |

(Continued)

OTHER PUBLICATIONS

International Search Report and Written Opinion for International Application No. PCT/US2022/026490 dated Aug. 12, 2022, 9 pages.

(Continued)

*Primary Examiner* — Doon Y Chow
(74) *Attorney, Agent, or Firm* — Mannava & Kang, P.C.

(57) ABSTRACT

A head-mounted display (HMD) for improved field of view (FOV) is provided. The head-mounted display (HMD) may include a display element to provide display light. The head-mounted display (HMD) may also include a lens element to provide display light to a user of the head-mounted display (HMD). The head-mounted display (HMD) may further include an optical element comprising at least one waveguide to provide improved central or peripheral field of view (FOV) for the user of head-mounted display (HMD). In some examples, the waveguide may be part of central optics and/or peripheral optics. The waveguide may have a planar waveguide profile or a curved waveguide profile. In some examples, the waveguide may be stacked or may include a graded index (GRIN) layer.

20 Claims, 14 Drawing Sheets

(56) References Cited

U.S. PATENT DOCUMENTS

| | | | |
|---|---|---|---|
| 11,454,809 B2* | 9/2022 | Lee | .................... G02B 27/1086 |
| 2017/0357089 A1 | 12/2017 | Tervo et al. | |
| 2020/0142196 A1 | 5/2020 | Mills et al. | |
| 2020/0166753 A1 | 5/2020 | Vallius et al. | |
| 2021/0382325 A1* | 12/2021 | Kubota | .................... G02C 7/06 |

OTHER PUBLICATIONS

International Preliminary Report on Patentability for International Application No. PCT/US2022/026490, dated Nov. 9, 2023, 7 pages.

* cited by examiner

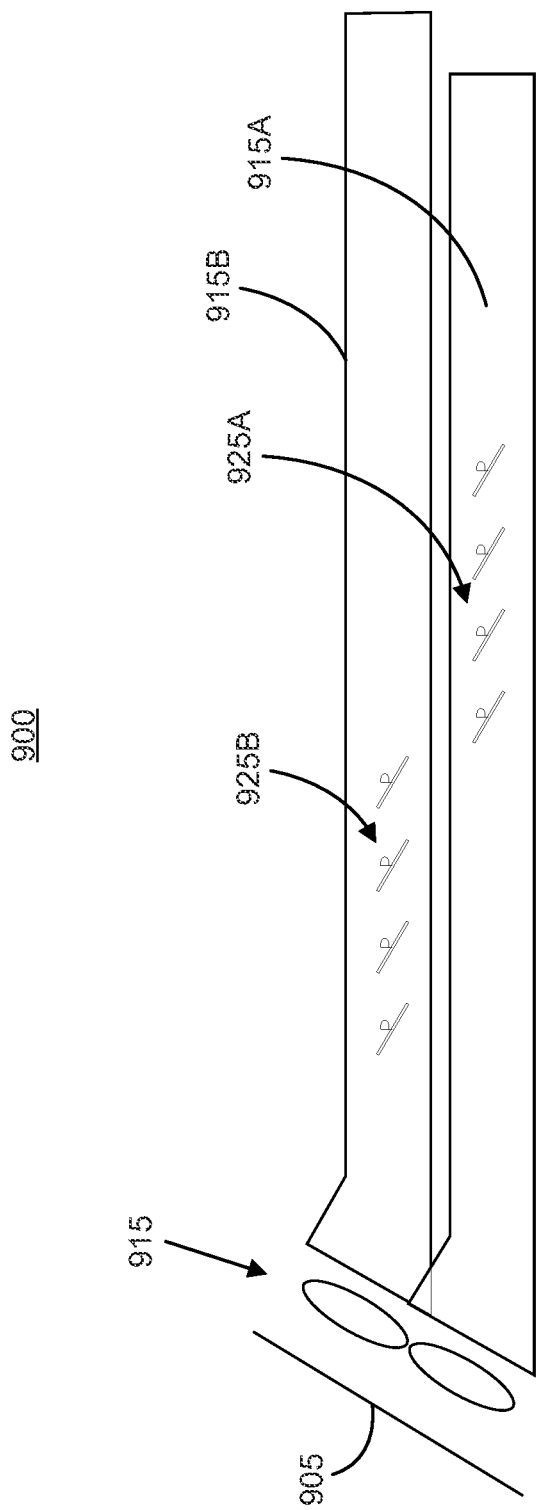

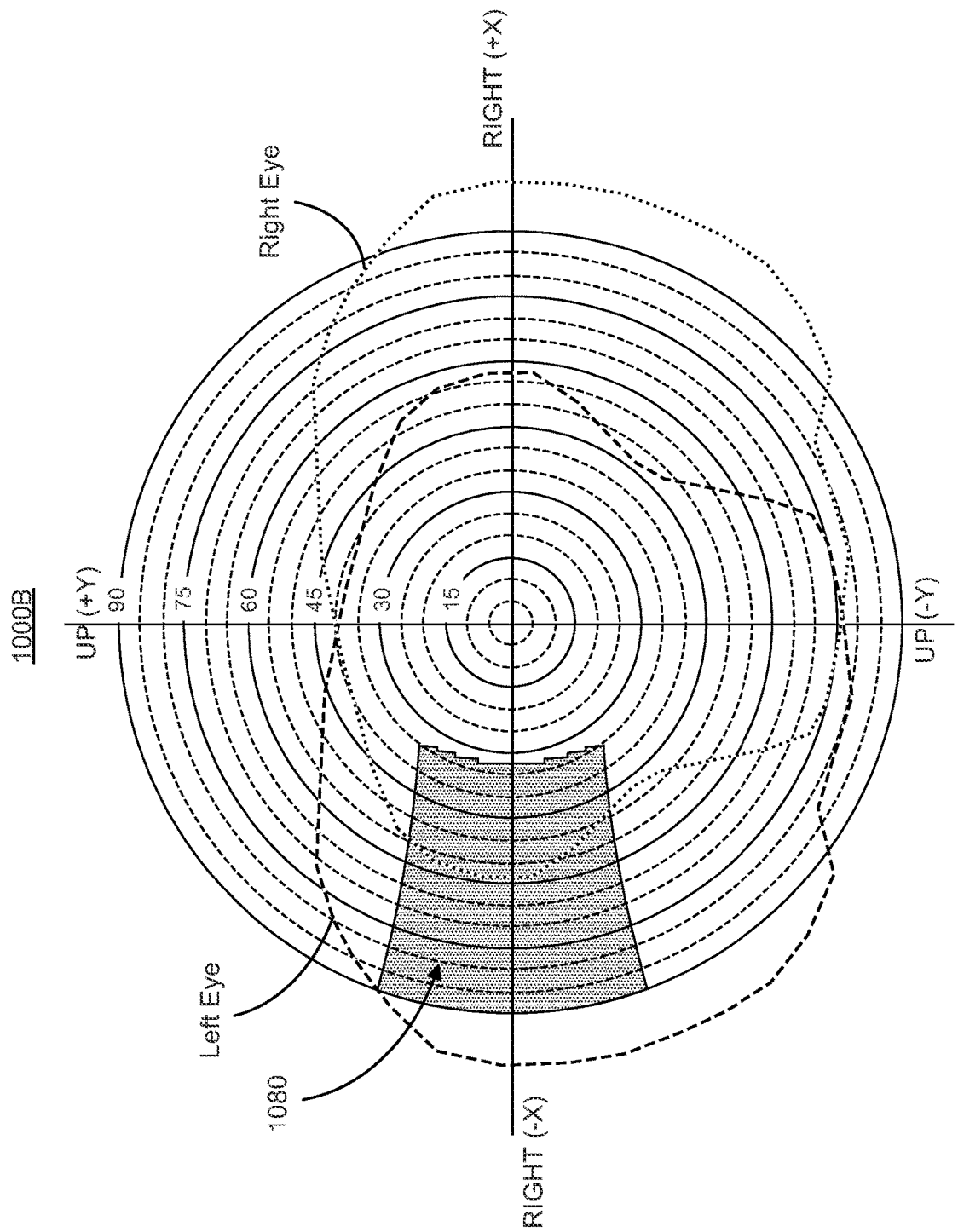

WAVEGUIDE CONFIGURATIONS IN A HEAD-MOUNTED DISPLAY (HMD) FOR IMPROVED FIELD OF VIEW (FOV)

This patent application claims priority to U.S. Provisional Patent Application No. 63/180,972, entitled "Waveguide Configuration in a Head-Mounted Display (HMD) for Improved Field of View (FOV)," filed on Apr. 28, 2021, which is hereby incorporated by reference herein in its entirety.

TECHNICAL FIELD

This patent application relates generally to head-mounted displays (HMDs), and more specifically, to various waveguide configurations in a head-mounted display (HMD) for improved field of view (FOV).

BACKGROUND

A head-mounted display (HMD) may be a headset or eyewear used for video playback, gaming, or sports, and in a variety of contexts and applications, such as virtual reality (VR), augmented reality (AR), or mixed reality (MR). A head-mounted display (HMD) may communicate information to or from a user who is wearing the headset. For example, a virtual reality (VR) headset may be used to present visual information to simulate any number of virtual environments when worn by a user. That same virtual reality (VR) headset may also receive information from the users eye movements, head/body shifts, voice, or other user-provided signals.

A conventional head-mounted display (HMD), however, relies on optical configurations that are typically large and bulky. These optical configurations not only increase headset size and weight, but often limit the function of the head-mounted display (HMD) by blocking areas of a see-through path or minimize central or peripheral fields of view (FOV) for the user. Attempts to reduce the size and bulkiness of conventional headsets may reduce the amount of space needed for other built-in features of a headset, such as active eye-tracking or facial recognition components, thereby restricting or limiting a headsets ability to function at full capacity. Furthermore, a conventional head-mounted display (HMD) may encounter other various issues associated with central and peripheral fields of view (FOV), such visual distortion and problems associated with resolution or optical tiling.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIGS. 9A-9B illustrate stacked waveguide configurations, according to an example.

FIGS. 10A-10B illustrate diagrams representative of central and peripheral fields of view (FOV) using the stacked waveguide configuration of FIG. 9, according to an example.

DETAILED DESCRIPTION

Figure 1:
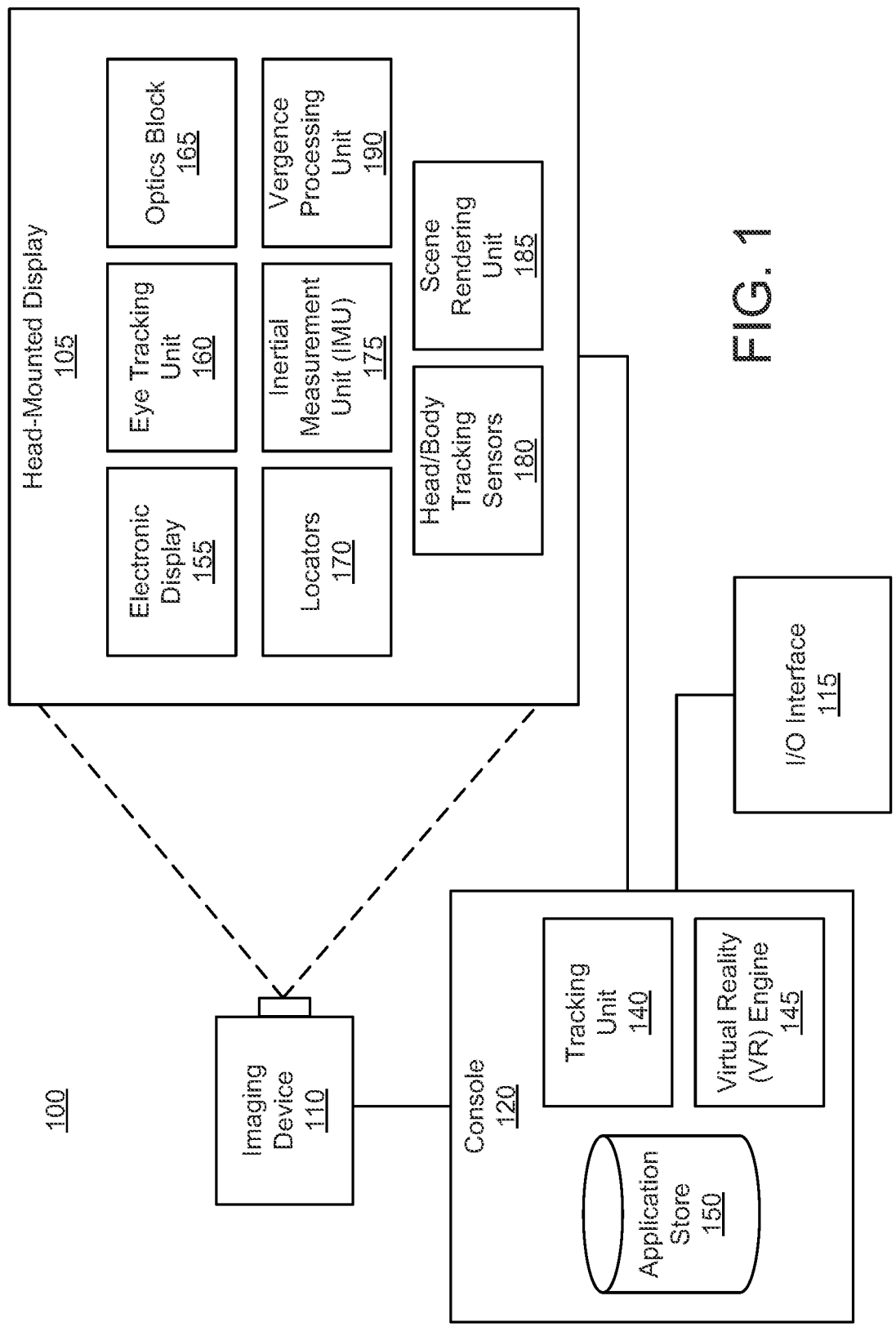
FIG. 1 illustrates a block diagram of a system associated with a head-mounted display (HMD) 105, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

As described above, a conventional head-mounted display (HMD), may include optical configurations that are large and bulky. These configurations not only increase size and weight, but may also visually block areas of a see-through path or minimize central or peripheral fields of view (FOV) for the user. Attempts to reduce the size and bulkiness, however, have also restricted the amount of the space needed for other built-in features of the headset, such as active eye-tracking or facial recognition components. With limited space, these components may not function at full capacity. Furthermore, a conventional head-mounted display (HMD) may also lack the ability to resolve issues associated with central and peripheral fields of view (FOV). Thus, a head-mounted display (HMD) with a smaller form factor that does not limit functionality, but increases central and peripheral fields of view (FOV) may be desired.

The systems and methods described herein may provide a head-mounted display (HMD) that uses one or more waveguide configurations to reduce overall weight and size. The one or more waveguide configurations described herein may maximize the see-through path by not blocking various optical components, while simultaneously enabling other headset features, such as head/eye tracking components so that they may function at fuller capacities. The waveguide configurations described herein may also improve central and/or peripheral fields of view (FOV) for the user. These and other examples will be described in more detail herein.

It should also be appreciated that the systems and methods described herein may be particularly suited for virtual reality (VR), augmented reality (AR), and/or mixed reality (MR) environments, but may also be applicable to a host of other systems or environments that can utilize optical waveguides. These may include, for example, cameras or sensors, networking, telecommunications, holography, or other optical systems. Thus, the waveguide configurations described herein, may be used in any of these or other examples. These and other benefits will be apparent in the description provided herein.

System Overview

Figure 2:
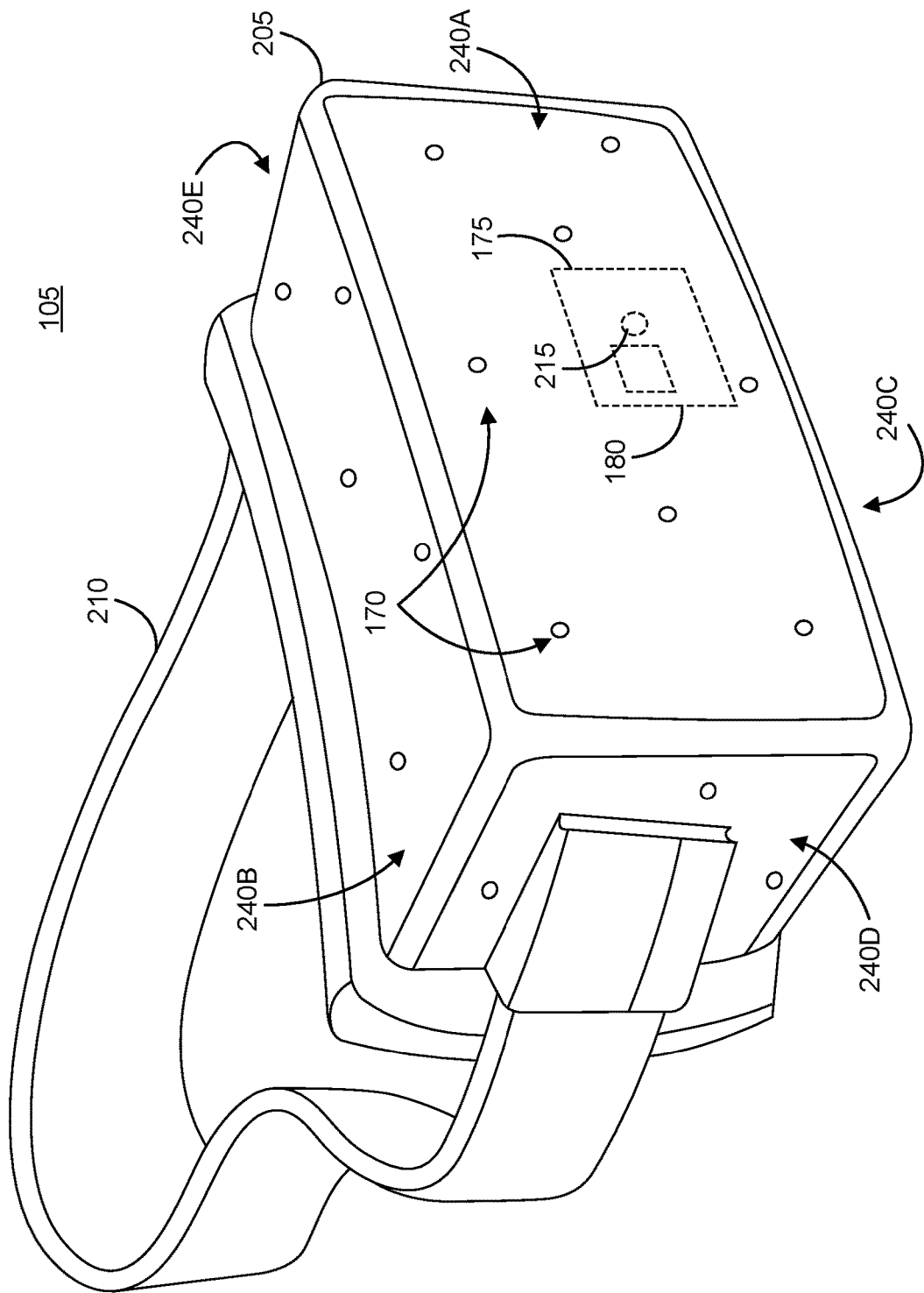
FIG. 2 shows a head-mounted display (HMD) 105, in accordance with an example.

Reference is made to FIGS. 1 and 2. FIG. 1 illustrates a block diagram of a system 100 associated with a head-mounted display (HMD) 105, according to an example. The system 100 may be used as a virtual reality (VR) system, an augmented reality (AR) system, a mixed reality (MR) system, or some combination thereof, or some other related system. It should be appreciated that the system 100 and the head-mounted display (HMD) 105 may be exemplary illustrations. Thus, the system 100 and/or the head-mounted display (HMD) 105 may or not include additional features and some of the features described herein may be removed and/or modified without departing from the scopes of the system 100 and/or the head-mounted display (HMD) 105 outlined herein.

In some examples, the system 100 may include the head-mounted display (HMD) 105, an imaging device 110, and an input/output (I/O) interface 115, each of which may be communicatively coupled to a console 120 or other similar device.

While FIG. 1 shows a single head-mounted display (HMD) 105, a single imaging device 110, and an I/O interface 115, it should be appreciated that any number of these components may be included in the system 100. For example, there may be multiple head-mounted displays (HMDs) 105, each having an associated input interface 115 and being monitored by one or more imaging devices 110, with each head-mounted display (HMD) 105, I/O interface 115, and imaging devices 110 communicating with the console 120. In alternative configurations, different and/or additional components may also be included in the system 100. As described herein, the head-mounted display (HMD) 105 may act be used as a virtual reality (VR), augmented reality (AR), and/or a mixed reality (MR) head-mounted display (HMD). A mixed reality (MR) and/or augmented reality (AR) head-mounted display (HMD), for instance, may augment views of a physical, real-world environment with computer-generated elements (e.g., images, video, sound, etc.).

The head-mounted display (HMD) 105 may communicate information to or from a user who is wearing the headset. In some examples, the head-mounted display (HMD) 105 may provide content to a user, which may include, but not limited to, images, video, audio, or some combination thereof. In some examples, audio content may be presented via a separate device (e.g., speakers and/or headphones) external to the head-mounted display (HMD) 105 that receives audio information from the head-mounted display (HMD) 105, the console 120, or both. In some examples, the head-mounted display (HMD) 105 may also receive information from a user. This information may include eye moments, head/body movements, voice (e.g., using an integrated or separate microphone device), or other user-provided content.

The head-mounted display (HMD) 105 may include any number of components, such as an electronic display 155, an eye tracking unit 160, an optics block 165, one or more locators 170, an inertial measurement unit (IMU) 175, one or head/body tracking sensors 180, and a scene rendering unit 185, and a vergence processing unit 190.

While the head-mounted display (HMD) 105 described in FIG. 1 is generally within a VR context as part of a VR system environment, the head-mounted display (HMD) 105 may also be part of other HMD systems such as, for example, an AR system environment. In examples that describe an AR system or MR system environment, the head-mounted display (HMD) 105 may augment views of a physical, real-world environment with computer-generated elements (e.g., images, video, sound, etc.).

An example of the head-mounted display (HMD) 105 is further described below in conjunction with FIG. 2. The head-mounted display (HMD) 105 may include one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The electronic display 155 may include a display device that presents visual data to a user. This visual data may be transmitted, for example, from the console 120. In some examples, electronic display 155 may also present tracking light for tracking the user's eye movements. It should be appreciated that the electronic display 155 may include any number of electronic display elements (e.g., a display for each of the user). Examples of a display device that may be used in the electronic display 155 may include, but not limited to a liquid crystal display (LCD), a light emitting diode (LED), an organic light emitting diode (OLED) display, an active-matrix organic light-emitting diode (AMO-LED) display, micro light emitting diode (micro-LED) display, some other display, or some combination thereof.

The optics block 165 may adjust its focal length based on or in response to instructions received from the console 120 or other component. In some examples, the optics block 165 may include a multi multifocal block to adjust a focal length (adjusts optical power) of the optics block 165.

The eye tracking unit 160 may track an eye position and eye movement of a user of the head-mounted display (HMD) 105. A camera or other optical sensor inside the head-mounted display (HMD) 105 may capture image information of a users eyes, and the eye tracking unit 160 may use the captured information to determine interpupillary distance, interocular distance, a three-dimensional (3D) position of each eye relative to the head-mounted display (HMD) 105 (e.g., for distortion adjustment purposes), including a magnitude of torsion and rotation (i.e., roll, pitch, and yaw) and gaze directions for each eye. The information for the position and orientation of the users eyes may be used to determine the gaze point in a virtual scene presented by the head-mounted display (HMD) 105 where the user is looking.

The vergence processing unit 190 may determine a vergence depth of a user's gaze. In some examples, this may be based on the gaze point or an estimated intersection of the gaze lines determined by the eye tracking unit 160. Vergence is the simultaneous movement or rotation of both eyes in opposite directions to maintain single binocular vision, which is naturally and/or automatically performed by the human eye. Thus, a location where a user's eyes are verged may refer to where the user is looking and may also typically be the location where the users eyes are focused. For example, the vergence processing unit 190 may triangulate the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The one or more locators 170 may be one or more objects located in specific positions on the head-mounted display (HMD) 105 relative to one another and relative to a specific reference point on the head-mounted display (HMD) 105. A locator 170, in some examples, may be a light emitting diode (LED), a corner cube reflector, a reflective marker, and/or a type of light source that contrasts with an environment in which the head-mounted display (HMD) 105 operates, or some combination thereof. Active locators 170 (e.g., an LED or other type of light emitting device) may emit light in the visible band ("380 nm to 850 nm), in the infrared (IR) band ("850 nm to 1 mm), in the ultraviolet band (10 nm to 380 nm), some other portion of the electromagnetic spectrum, or some combination thereof.

The one or more locators 170 may be located beneath an outer surface of the head-mounted display (HMD) 105, which may be transparent to wavelengths of light emitted or reflected by the locators 170 or may be thin enough not to substantially attenuate wavelengths of light emitted or reflected by the locators 170. Further, the outer surface or other portions of the head-mounted display (HMD) 105 may be opaque in the visible band of wavelengths of light. Thus, the one or more locators 170 may emit light in the IR band while under an outer surface of the head-mounted display (HMD) 105 that may be transparent in the IR band but opaque in the visible band.

The inertial measurement unit (IMU) 175 may be an electronic device that generates, among other things, fast calibration data based on or in response to measurement signals received from one or more of the head/body tracking sensors 180, which may generate one or more measurement signals in response to motion of head-mounted display (HMD) 105. Examples of the head/body tracking sensors 180 may include, but not limited to, accelerometers, gyroscopes, magnetometers, cameras, other sensors suitable for detecting motion, correcting error associated with the inertial measurement unit (IMU) 175, or some combination thereof. The head/body tracking sensors 180 may be located external to the inertial measurement unit (IMU) 175, internal to the inertial measurement unit (IMU) 175, or some combination thereof.

Based on or in response to the measurement signals from the head/body tracking sensors 180, the inertial measurement unit (IMU) 175 may generate fast calibration data indicating an estimated position of the head-mounted display (HMD) 105 relative to an initial position of the head-mounted display (HMD) 105. For example, the head/body tracking sensors 180 may include multiple accelerometers to measure translational motion (forward/back, up/down, left/right) and multiple gyroscopes to measure rotational motion (e.g., pitch, yaw, and roll). The inertial measurement unit (IMU) 175 may then, for example, rapidly sample the measurement signals and/or calculate the estimated position of the head-mounted display (HMD) 105 from the sampled data. For example, the inertial measurement unit (IMU) 175 may integrate measurement signals received from the accelerometers over time to estimate a velocity vector and integrates the velocity vector over time to determine an estimated position of a reference point on the head-mounted display (HMD) 105. It should be appreciated that the reference point may be a point that may be used to describe the position of the head-mounted display (HMD) 105. While the reference point may generally be defined as a point in space, in various examples or scenarios, a reference point as used herein may be defined as a point within the head-mounted display (HMD) 105 (e.g., a center of the inertial measurement unit (IMU) 175). Alternatively or additionally, the inertial measurement unit (IMU) 175 may provide the sampled measurement signals to the console 120, which may determine the fast calibration data or other similar or related data.

The inertial measurement unit (IMU) 175 may additionally receive one or more calibration parameters from the console 120. As described herein, the one or more calibration parameters may be used to maintain tracking of the head-mounted display (HMD) 105. Based on a received calibration parameter, the inertial measurement unit (IMU) 175 may adjust one or more of the IMU parameters (e.g., sample rate). In some examples, certain calibration parameters may cause the inertial measurement unit (IMU) 175 to update an initial position of the reference point to correspond to a next calibrated position of the reference point. Updating the initial position of the reference point as the next calibrated position of the reference point may help reduce accumulated error associated with determining the estimated position. The accumulated error, also referred to as drift error, may cause the estimated position of the reference point to "drift" away from the actual position of the reference point over time.

The scene rendering unit 185 may receive content for the virtual scene from a VR engine 145 and may provide the content for display on the electronic display 155. Additionally or alternatively, the scene rendering unit 185 may adjust the content based on information from the inertial measurement unit (IMU) 175, the vergence processing unit 830, and/or the head/body tracking sensors 180. The scene rendering unit 185 may determine a portion of the content to be displayed on the electronic display 155 based at least in part on one or more of the tracking unit 140, the head/body tracking sensors 180, and/or the inertial measurement unit (IMU) 175.

The imaging device 110 may generate slow calibration data in accordance with calibration parameters received from the console 120. Slow calibration data may include one or more images showing observed positions of the locators 125 that are detectable by imaging device 110. The imaging device 110 may include one or more cameras, one or more video cameras, other devices capable of capturing images including one or more locators 170, or some combination thereof. Additionally, the imaging device 110 may include one or more filters (e.g., for increasing signal to noise ratio). The imaging device 110 may be configured to detect light emitted or reflected from the one or more locators 170 in a field of view of the imaging device 110. In examples where the locators 170 include one or more passive elements (e.g., a retroreflector), the imaging device 110 may include a light source that illuminates some or all of the locators 170, which may retro-reflect the light towards the light source in the imaging device 110. Slow calibration data may be communicated from the imaging device 110 to the console 120, and the imaging device 110 may receive one or more calibration parameters from the console 120 to adjust one or more imaging parameters (e.g., focal length, focus, frame rate, ISO, sensor temperature, shutter speed, aperture, etc.).

The I/O interface 115 may be a device that allows a user to send action requests to the console 120. An action request may be a request to perform a particular action. For example, an action request may be to start or end an application or to perform a particular action within the application. The I/O interface 115 may include one or more input devices. Example input devices may include a keyboard, a mouse, a hand-held controller, a glove controller, and/or any other suitable device for receiving action requests and communicating the received action requests to the console 120. An action request received by the I/O interface 115 may be communicated to the console 120, which may perform an action corresponding to the action request. In some examples, the I/O interface 115 may provide haptic feedback to the user in accordance with instructions received from the console 120. For example, haptic feedback may be provided by the I/O interface 115 when an action request is received, or the console 120 may communicate instructions to the I/O interface 115 causing the I/O interface 115 to generate haptic feedback when the console 120 performs an action.

The console 120 may provide content to the head-mounted display (HMD) 105 for presentation to the user in accordance with information received from the imaging device 110, the head-mounted display (HMD) 105, or the I/O interface 115. The console 120 includes an application store 150, a tracking unit 140, and the VR engine 145. Some examples of the console 120 have different or additional units than those described in conjunction with FIG. 1. Similarly, the functions further described below may be distributed among components of the console 120 in a different manner than is described here.

The application store 150 may store one or more applications for execution by the console 120, as well as other various application-related data. An application, as used herein, may refer to a group of instructions, that when executed by a processor, generates content for presentation to the user. Content generated by an application may be in response to inputs received from the user via movement of the head-mounted display (HMD) 105 or the I/O interface 115. Examples of applications may include gaming applications, conferencing applications, video playback application, or other applications.

The tracking unit 140 may calibrate the system 100. This calibration may be achieved by using one or more calibration parameters and may adjust one or more calibration parameters to reduce error in determining position of the head-mounted display (HMD) 105. For example, the tracking unit 140 may adjust focus of the imaging device 110 to obtain a more accurate position for observed locators 170 on the head-mounted display (HMD) 105. Moreover, calibration performed by the tracking unit 140 may also account for information received from the inertial measurement unit (IMU) 175. Additionally, if tracking of the head-mounted display (HMD) 105 is lost (e.g., imaging device 110 loses line of sight of at least a threshold number of locators 170), the tracking unit 140 may re-calibrate some or all of the system 100 components.

Additionally, the tracking unit 140 may track the movement of the head-mounted display (HMD) 105 using slow calibration information from the imaging device 110 and may determine positions of a reference point on the head-mounted display (HMD) 105 using observed locators from the slow calibration information and a model of the head-mounted display (HMD) 105. The tracking unit 140 may also determine positions of the reference point on the head-mounted display (HMD) 105 using position information from the fast calibration information from the inertial measurement unit (IMU) 175 on the head-mounted display (HMD) 105. Additionally, the tracking unit 160 may use portions of the fast calibration information, the slow calibration information, or some combination thereof, to predict a future location of the head-mounted display (HMD) 105, which may be provided to the VR engine 145.

The VR engine 145 may execute applications within the system 100 and may receive position information, acceleration information, velocity information, predicted future positions, other information, or some combination thereof for the head-mounted display (HMD) 105 from the tracking unit 140 or other component. Based on or in response to the received information, the VR engine 145 may determine content to provide to the head-mounted display (HMD) 105 for presentation to the user. This content may include, but not limited to, a virtual scene, one or more virtual objects to overlay onto a real world scene, etc.

In some examples, the VR engine 145 may maintain focal capability information of the optics block 165. Focal capability information, as used herein, may refer to information that describes what focal distances are available to the optics block 165. Focal capability information may include, e.g., a range of focus the optics block 165 is able to accommodate (e.g., 0 to 4 diopters), a resolution of focus (e.g., 0.25 diopters), a number of focal planes, combinations of settings for switchable half wave plates (SHWPs) (e.g., active or non-active) that map to particular focal planes, combinations of settings for SHWPS and active liquid crystal lenses that map to particular focal planes, or some combination thereof.

The VR engine 145 may generate instructions for the optics block 165. These instructions may cause the optics block 165 to adjust its focal distance to a particular location. The VR engine 145 may generate the instructions based on focal capability information and, e.g., information from the vergence processing unit 190, the inertial measurement unit (IMU) 175, and/or the head/body tracking sensors 180. The VR engine 145 may use information from the vergence processing unit 190, the inertial measurement unit (IMU) 175, and the head/body tracking sensors 180, other source, or some combination thereof, to select an ideal focal plane to present content to the user. The VR engine 145 may then use the focal capability information to select a focal plane that is closest to the ideal focal plane. The VR engine 145 may use the focal information to determine settings for one or more SHWPs, one or more active liquid crystal lenses, or some combination thereof, within the optics block 176 that are associated with the selected focal plane. The VR engine 145 may generate instructions based on the determined settings, and may provide the instructions to the optics block 165.

The VR engine 145 may perform any number of actions within an application executing on the console 120 in response to an action request received from the I/O interface 115 and may provide feedback to the user that the action was performed. The provided feedback may be visual or audible feedback via the head-mounted display (HMD) 105 or haptic feedback via the I/O interface 115.

FIG. 2 shows a head-mounted display (HMD) 105, in accordance with an example. The head-mounted display (HMD) 105 may include a front rigid body 205 and a band 210. The front rigid body 205 may include an electronic display (not shown), an inertial measurement unit (IMU) 175, one or more position sensors (e.g., head/body tracking sensors 180), and one or more locators 170, as described herein. In some examples, a user movement may be detected by use of the inertial measurement unit (IMU) 175, position sensors (e.g., head/body tracking sensors 180), and/or the one or more locators 170, and an image may be presented to a user through the electronic display based on or in response to detected user movement. In some examples, the head-mounted display (HMD) 105 may be used for presenting a virtual reality, an augmented reality, or a mixed reality environment.

At least one position sensor, such as the head/body tracking sensor 180 described with respect to FIG. 1, may generate one or more measurement signals in response to motion of the head-mounted display (HMD) 105. Examples of position sensors may include: one or more accelerometers, one or more gyroscopes, one or more magnetometers, another suitable type of sensor that detects motion, a type of sensor used for error correction of the inertial measurement unit (IMU) 175, or some combination thereof. The position sensors may be located external to the inertial measurement unit (IMU) 175, internal to the inertial measurement unit (IMU) 175, or some combination thereof. In FIG. 2, the position sensors may be located within the inertial measurement unit (IMU) 175, and neither the inertial measurement unit (IMU) 175 nor the position sensors (e.g., head/body tracking sensors 180) may or may not necessarily be visible to the user.

Based on the one or more measurement signals from one or more position sensors, the inertial measurement unit (IMU) 175 may generate calibration data indicating an estimated position of the head-mounted display (HMD) 105 relative to an initial position of the head-mounted display (HMD) 105. In some examples, the inertial measurement unit (IMU) 175 may rapidly sample the measurement signals and calculates the estimated position of the HMD 100 from the sampled data. For example, the inertial measurement unit (IMU) 175 may integrate the measurement signals received from the one or more accelerometers (or other position sensors) over time to estimate a velocity vector and integrates the velocity vector over time to determine an estimated position of a reference point on the head-mounted display (HMD) 105. Alternatively or additionally, the inertial measurement unit (IMU) 175 may provide the sampled measurement signals to a console (e.g., a computer), which may determine the calibration data. The reference point may be a point that may be used to describe the position of the head-mounted display (HMD) 105. While the reference point may generally be defined as a point in space; however, in practice, the reference point may be defined as a point within the head-mounted display (HMD) 105 (e.g., a center of the inertial measurement unit (IMU) 175).

One or more locators 170, or portions of locators 170, may be located on a front side 240A, a top side 240B, a bottom side 240C, a right side 240D, and a left side 240E of the front rigid body 205 in the example of FIG. 2. The one or more locators 170 may be located in fixed positions relative to one another and relative to a reference point 215. In FIG. 2, the reference point 215, for example, may be located at the center of the inertial measurement unit (IMU) 175. Each of the one or more locators 170 may emit light that is detectable by an imaging device (e.g., camera or an image sensor).

Although depicted as separate components in FIG. 1, it should be appreciated that the head-mounted display (HMD) 105, the imaging device 110, the I/O interface 115, and the console 120 may be integrated into a single device or wearable headset. For example, this single device or wearable headset may include all the performance capabilities of the system 100 of FIG. 1 within a single, self-contained headset. Also, in some examples, tracking may be achieved using an "inside-out" approach, rather than an "outside-in" approach. In an "inside-out" approach, an external imaging device 110 or locators 170 may not be needed or provided to system 100. Moreover, although the head-mounted display (HMD) 105 is depicted and described as a "headset," it should be appreciated that the head-mounted display (HMD) 105 may also be provided as eyewear or other wearable device (on a head or other body part). Other various examples may also be provided depending on use or application. Furthermore, some head-mounted displays (HMDs) may provide an expanded field of view for a more immersive user experience.

Improving Field of View

A headset equipped with a wide field of view (FOV) may improve a user's sense of immersion, presence, and performance in some task in any number of virtual environments. Conventional head-mounted displays (HMDs) typically have limited field of view (FOV) (~80°×90°). Because the natural human field of view (FOV) is quite large (~210°× 135°), recent advances in technology have been looking to discover ways to improve a headsets overall field of view (FOV).

It should be appreciated that there are many challenges associated with increasing the field of view (FOV) in head-mounted displays (HMDs). For example, in order to provide a wide field of view (FOV), a head-mounted display (HMD) may be required to distribute all available pixels over a wider angle. However, in doing so, spatial resolution of the pixels may be adversely reduced. Furthermore, there may be other visual distortions and adverse effects that also result. These may include, but not limited to, issues related to pupil size, pupil swim, latency, weight, price, etc.

To combat some of these issues, some head-mounted display (HMD) may use tiled displays to merge various optical components, such as lenses and microdisplays, to increase field of view (FOV) without sacrificing resolution. As described herein, the systems and methods may use various waveguide configurations in a head-mounted display (HMD) for improved and expanded field of view (FOV) in a more seamlessly way when compared to conventional systems. More specifically, the use of optical waveguide configurations, as described herein, may improve central and peripheral fields of view (FOV) while maintaining high resolution and/or minimizing or eliminating visual distortions. In addition, the systems and methods described herein may reduce the overall form factor of a head-mounted display (HMD), reduce or eliminate any black seam effects created by tiling optics in conventional headsets, obviate any blocked see-through paths, and allow for greater functionality of other built-in features of the headset, such as eye-tracking.

Tiled Optics for Improved Field of View

Figure 3:
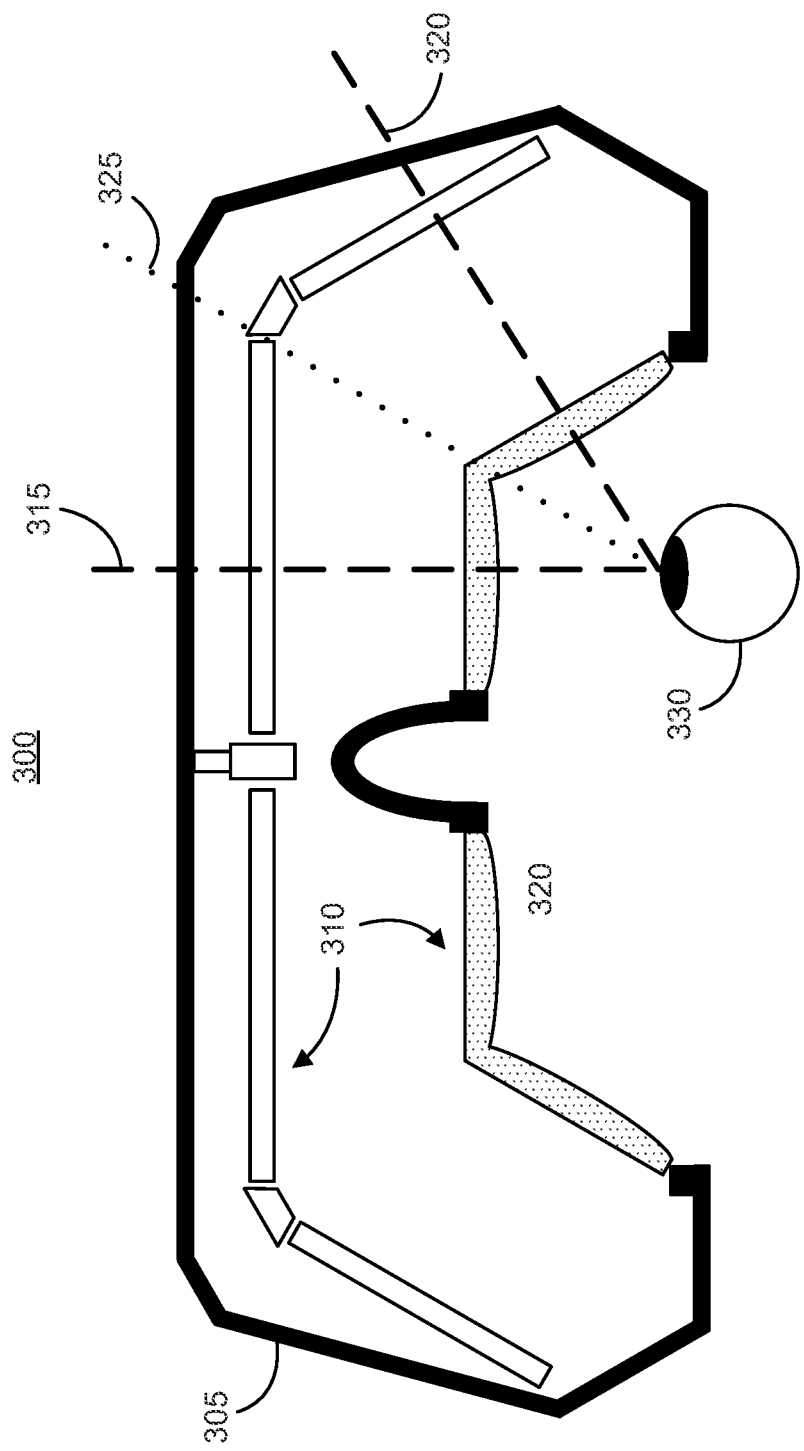
FIG. 3 illustrates a cross section view of simplified version of a head-mounted display (HMD) 300 using tiled optics, according to an example.

FIG. 3 illustrates a cross section view of simplified version of a head-mounted display (HMD) 300 using tiled optics, according to an example. The cross section view of the head-mounted display (HMD) 300 may include a rigid body 305 housing various tiled optical components 310 (e.g., lenses, microdisplays, optical waveguides, etc.). The tiled optical components 310 may provide a larger or expanded field of view (FOV) to improve a users immersive experience. In some examples, the head-mounted display (HMD) 300, as shown, may include a primary optical axis 315 and a tiled optical axis 320, with a plane of symmetry 325 dividing them. To a users eye 330, the primary optical axis 315 may provide a central field of view (FOV) and the tiled optical axes 320 may provide a peripheral field of view (FOV). It should be appreciated that in some examples, these tiled optical components 310 may be a part of or be included with the electronic display 155 and/or optics block 165, as described with respect to FIG. 1. Accordingly, these components may include, but not limited to, any number of display devices and/or optical components as described above. By tiling these optical components together and using both the primary optical axis 315 for the central field of view (FOV) and the tiled optical axes 320 for the peripheral field of view (FOV), the overall FOV may be improved and expanded without generally sacrificing resolution.

Waveguide Optics for Improved Field of View

Figure 4A:
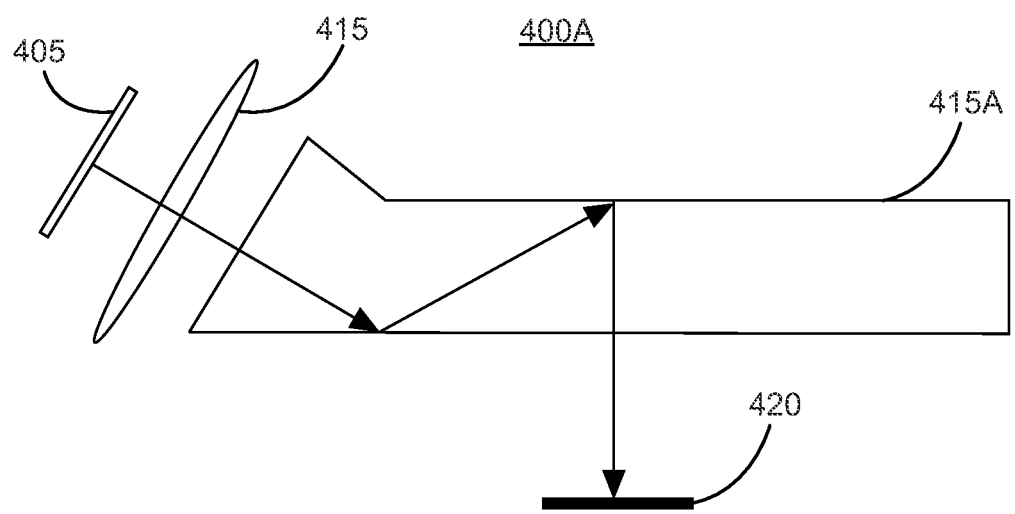
FIGS. 4A-4B illustrate waveguide profiles for expanded FOV in a head-mounted display (HMD), according to an example.
Figure 4B:
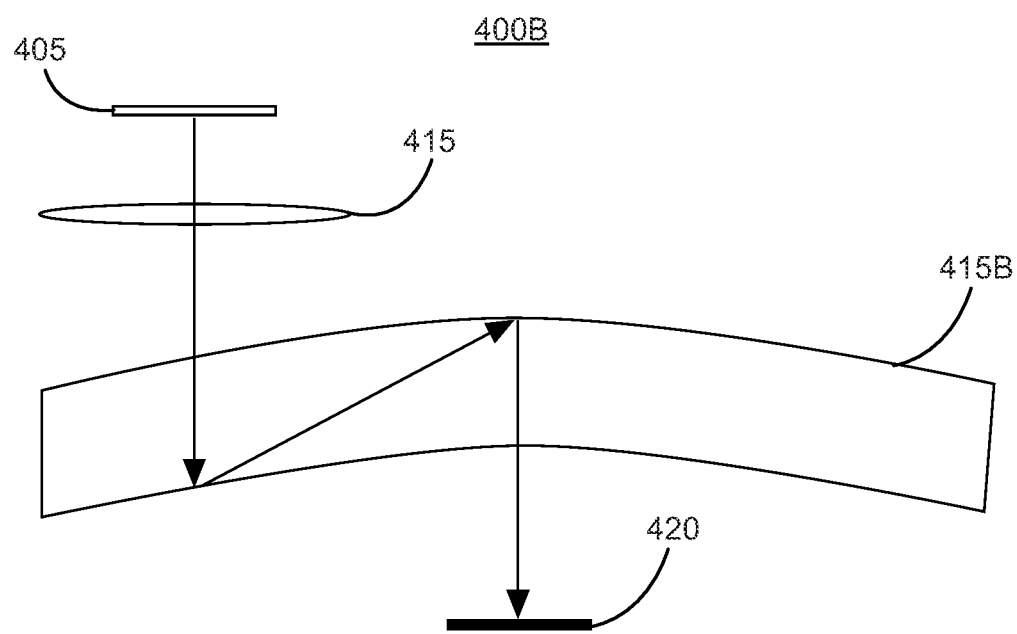

As described herein, one or more optical waveguides may help provide an expanded and improved field of view (FOV) in headsets with tiled optics. FIGS. 4A-4B illustrate waveguide profiles 400A-400B for expanded field of view (FOV) in a head-mounted display (HMD), according to an example. FIG. 4A illustrates a planar waveguide profile 400A. As shown, the planar waveguide profile 400A may include a microdisplay 405, one or more collimator optics 415, and a planar waveguide 415A. The microdisplay 405 may provide visual content to a user, but that visual content may first traverse through the one or more collimator optics 415 and through the planar optical waveguide 415A before hitting an eye pupil 420 (or an eye box). In some examples, the microdisplay 405 may include any flat or curved panel display, scanning engines, and/or any other source that provides visual data or information. For example, the microdisplay 405 may include any type of display, such as a liquid crystal display (LCD), a light emitting diode (LED), an organic light emitting diode (OLED) display, an active-matrix organic light-emitting diode (AMOLED) display, micro light emitting diode (micro-LED) display, some other display, or some combination thereof. The one or more collimator optics 415 may include any variety of collimator optics, such as microlenses or element to collimate visual data or information.

It should be appreciated that in this planar waveguide profile 400A, the microdisplay 405 and the one or more collimator optics 415 may be positioned near the edge of the planar optical waveguide 415A. Accordingly, the arrangement of this planar waveguide profile 400A may maximize the field of view (FOV) and prevent the eye pupil 420 from being substantially blocked by either the microdisplay 405 and/or the one or more collimator optics 415 along a see-through path.

FIG. 4B illustrates a curved waveguide profile 400B of a head-mounted display (HMD), according to an example. Here, the curved waveguide profile 400B may use a curved optical waveguide 415B instead of a planar optical waveguide 415A, as shown in FIG. 4A. In this example, the microdisplay 405 may provide visual content to that first passes through the one or more collimator optics 415 and may be reflected within the curved optical waveguide 415B before hitting the eye pupil 420.

Like profile 400A, the microdisplay 405 and the one or more collimator optics 415 of profile 400B may also be positioned near the edge of the planar optical waveguide 415A, thereby achieving similar advantages of the planar waveguide profile 400A of FIG. 400A.

It should be appreciated that, in some examples, the thickness of the planar waveguide 415A and the curved optical waveguide 415B may in the range of 0.3-7.0 millimeters (mm). That said, other various dimensions (larger or smaller) may be also be provided depending on the various waveguide applications. Details of each of these waveguides, waveguide configurations, and their uses to improve and/or expand field of view (FOV) will be described in more detail herein.

Example of Planar Waveguide

Figure 5A:
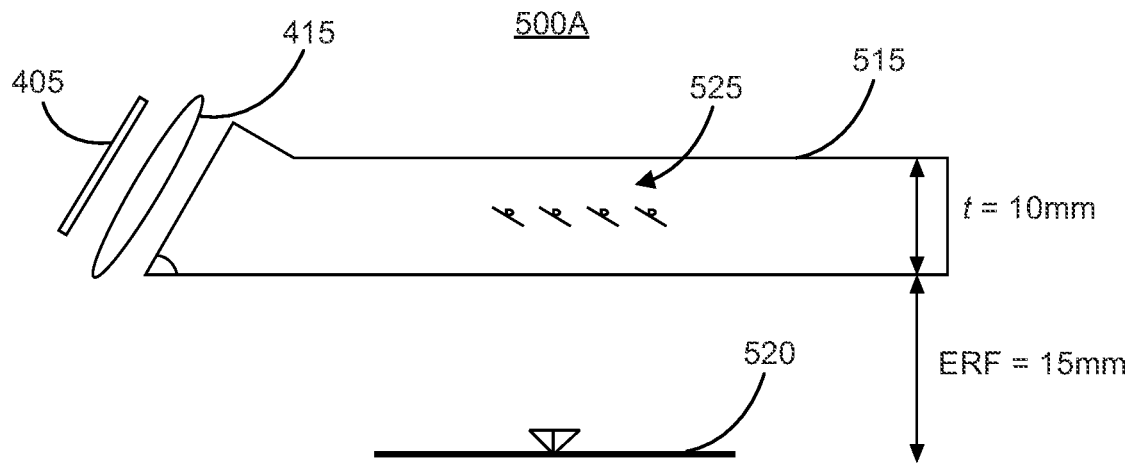
FIGS. 5A-5C illustrate various views of a planar waveguide, according to an example.
Figure 5B:
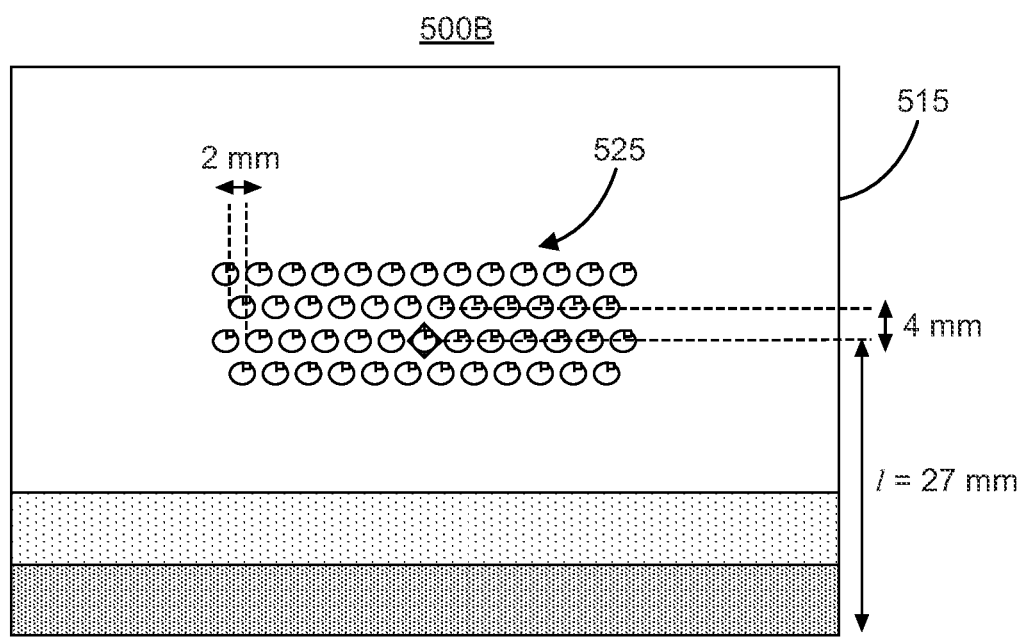
Figure 5C:
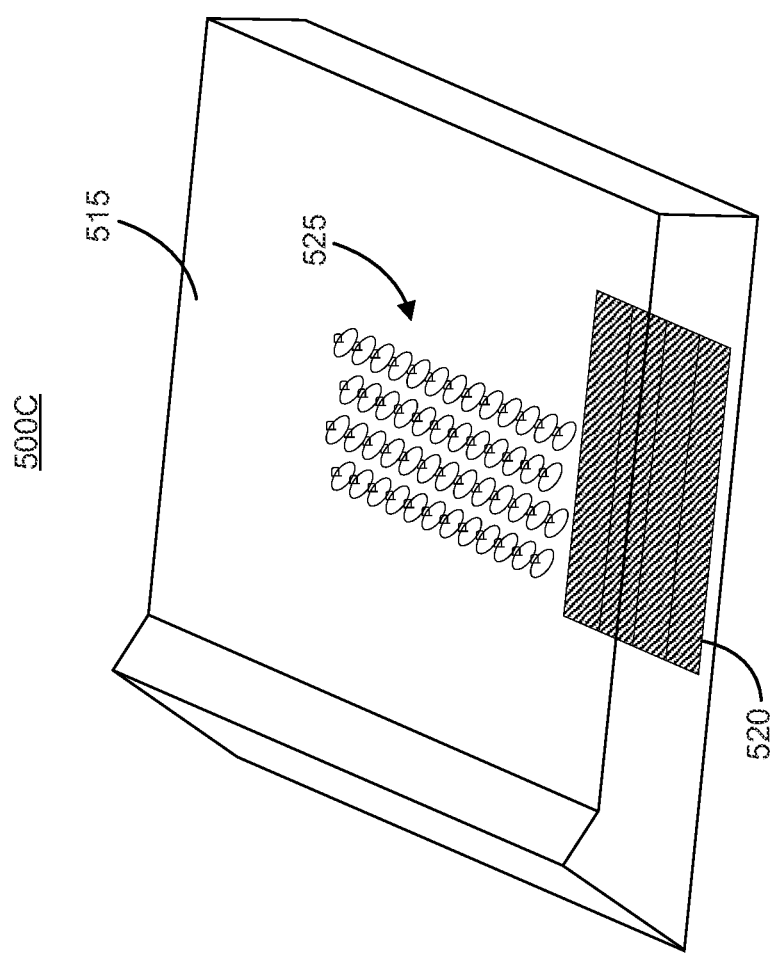

FIGS. 5A-5C illustrate various views 500A-500C of the planar waveguide 415A described in FIG. 4A, according to an example. FIG. 5A illustrates a cross sectional view 500A of a planar waveguide 515, according to an example. As shown, the planar waveguide 515 may include a discrete elliptical mirror array 525 within a substrate of the planar waveguide 515. In some examples, the planar waveguide 515 may have a thickness (t) in the range of approximately 1-10 mm, where each mirror of the discrete elliptical mirror array 525 may have a diameter of approximately 3 mm and an eye relief distance (ERF) of approximately 15 mm. In addition, the planar waveguide 515 may have an entrance face having an angle (β) of 60°.

FIG. 5B illustrates a top or flat view 500B of the planar waveguide 515, according to an example. As shown, the discrete elliptical mirror array 525 may be placed in at least two dimensions within the substrate of the planar waveguide 515. For example, the discrete elliptical mirror array 525 may include a mirror grid having four rows, each row having either 13 or 12 discrete elliptical mirrors (e.g., in alternating fashion) for a total of 50 discrete elliptical mirrors, where there may be a separation of approximately 4 mm between the discrete elliptical mirrors, and there may be a shearing distance of approximately 2 mm between neighboring rows of discrete elliptical mirrors. In addition, there may be a length (l) of approximately 27 mm from an edge of the entrance face to the center of the planar waveguide 515. It should be appreciated that other various dimensions may be also be provided depending on the various applications and scenarios.

FIG. 5C illustrates a planar view 500C of a planar waveguide 515, according to an example. As shown in the planar view 500C, the planar waveguide 515 may be used potentially as central optics for improved or expanded field of view (FOV) in a variety of examples. Although specific sizes and dimensions are provided herein, it should be appreciated that other various dimensions may be also be provided depending on the various applications and scenarios.

Although FIGS. 5A-5C depict a planar waveguide 515, it should be appreciated that a curved waveguide, having a profile similar to that described with respect to FIG. 4B may also be used and may be relatively interchangeably as central optics for improved or expanded field of view (FOV) in a variety of examples like that of the planar waveguide 515 of FIGS. 5A-5C described above.

In some examples, it should be appreciated that the planar or curved waveguide described herein may be diffractive, geometrical, or hybrid type. The planar or curved waveguide described herein may also be used as a waveguide coupler, such as a prism or diffractive in-coupler (e.g., surface relief grating (SRG), volume Bragg grating (VBG), holographic optical element (HOE), etc.) and/or with mirror, beam splitter, or diffractive out-coupler. Also, the waveguide may be 1D or 2D pupil expansions (1-2 coupler area). It should be appreciated that the examples illustrated in FIGS. 5A-C may include a waveguide coupler, such as a prism in-coupler and a 1D expansion of a pupil may be achieved with discrete elliptical mirror out-couplers, arranged in planar rows (which may be parallel). Alternatively, out-couplers may be continuous partially-mirrored planar facets that function akin to Venetian-type blinds. It should also be appreciated that the pupil expansion may be 2D with separate 1D geometric expansions. Also, with diffractive in-coupling and out-coupling, 2D expansion of the pupil may be achieved with one or more gratings on either side of the waveguide oriented to split the pupil over a large area.

Waveguide Optics for Improved Central Field of View

Figure 6B:
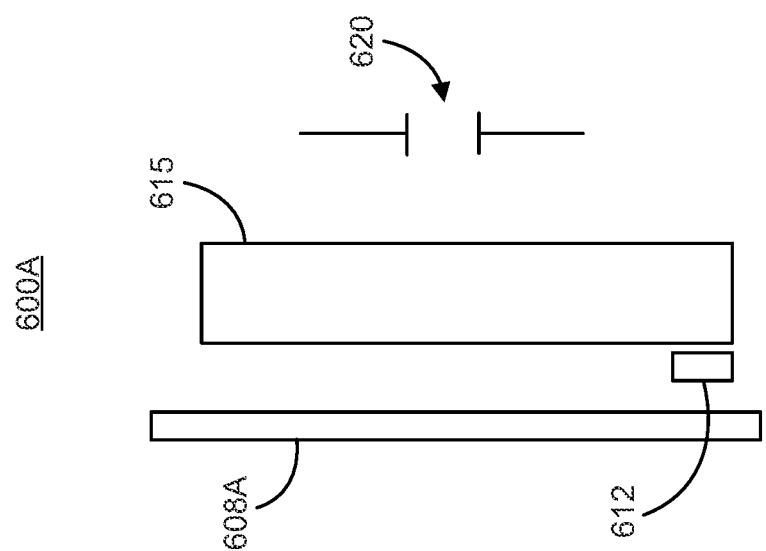
FIGS. 6A-6B illustrates block diagrams 600A-600B of a planar waveguide configuration for improving central field of view (FOV), according to an example.
Figure 6A:
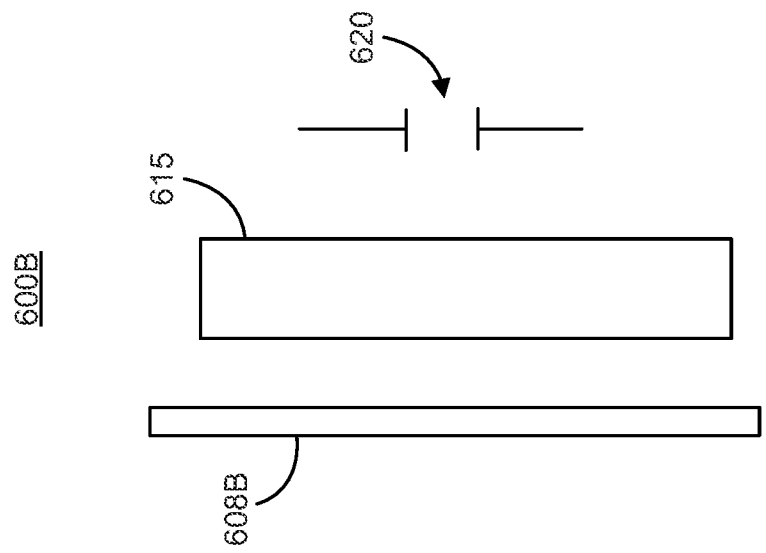

In some examples, a planar waveguide or a curved waveguide as described herein may be used to improve central optics of a headset. FIGS. 6A-6B illustrates block diagrams 600A-600B of a planar waveguide configuration for improving central field of view (FOV), according to an example. As shown, the block diagram 600A may illustrate an opaque block 608A, an eye-tracking element 612, waveguide optics 615 (e.g., planar or curved waveguide), and an eye pupil 620. Here, the waveguide optics 615 may operate similar to the examples described with respect to FIGS. 4A-4B and FIGS. 5A-5C. As a result, the waveguide optics 615 may be transparent and free of optical power, whose components typically obscure vision. Not only does the waveguide optics 615 allow for a less obtrusive see-through path, it also creates additional space for the eye-tracking element 612 or other element to reside comfortably, and thereby operate at fuller capacity.

It should be appreciated that in some examples, a switchable transparent or opaque element, such as a film shutter, may be provided. For example, FIG. 6B illustrates a block diagram 600B of an example without eye-tracking optics. Here, a film shutter 208B that may be switchable and therefore usable in virtual reality (VR), augmented reality (AR), and/or mixed reality (MR) environments may be provided. Such flexibility may not be so easily achieved with convention headsets and systems.

Waveguide Optics for Improved Peripheral Field of View

The waveguide optics described herein may also be used to improve peripheral fields of view (FOV) in headsets as well. The waveguide optics, for example, may also be tiled with central optics to provide better shaping for improved peripheral field of view (FOV). For example, this may be achieved by using the waveguide profiles described herein and providing a conical (or similarly shaped) waveguide configuration around the central optics.

Figure 7A:
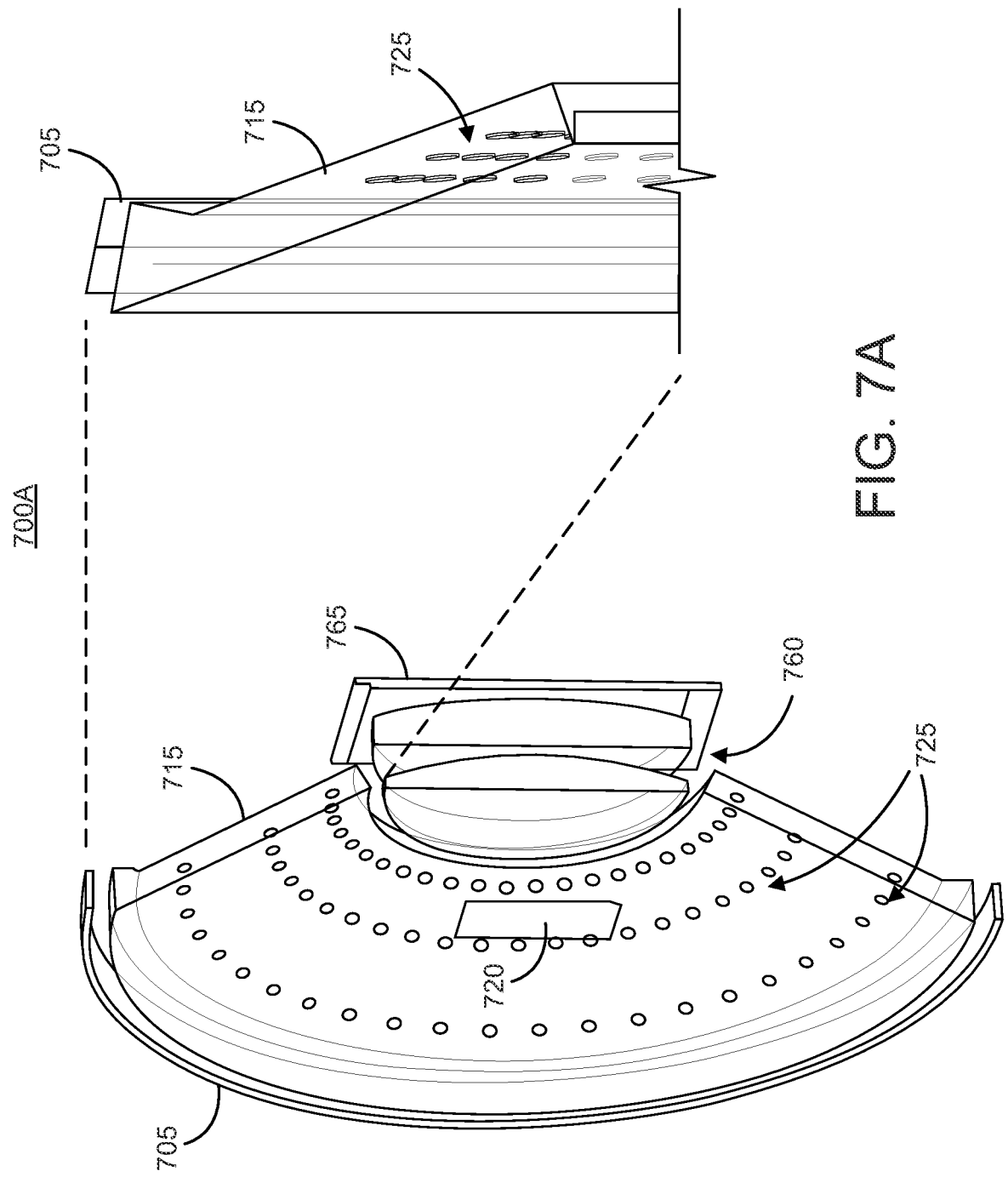
FIGS. 7A-7C illustrate various views of a conical waveguide configuration using a planar waveguide profile for improved peripheral fields of view (FOV), according to an example.
Figure 7C:
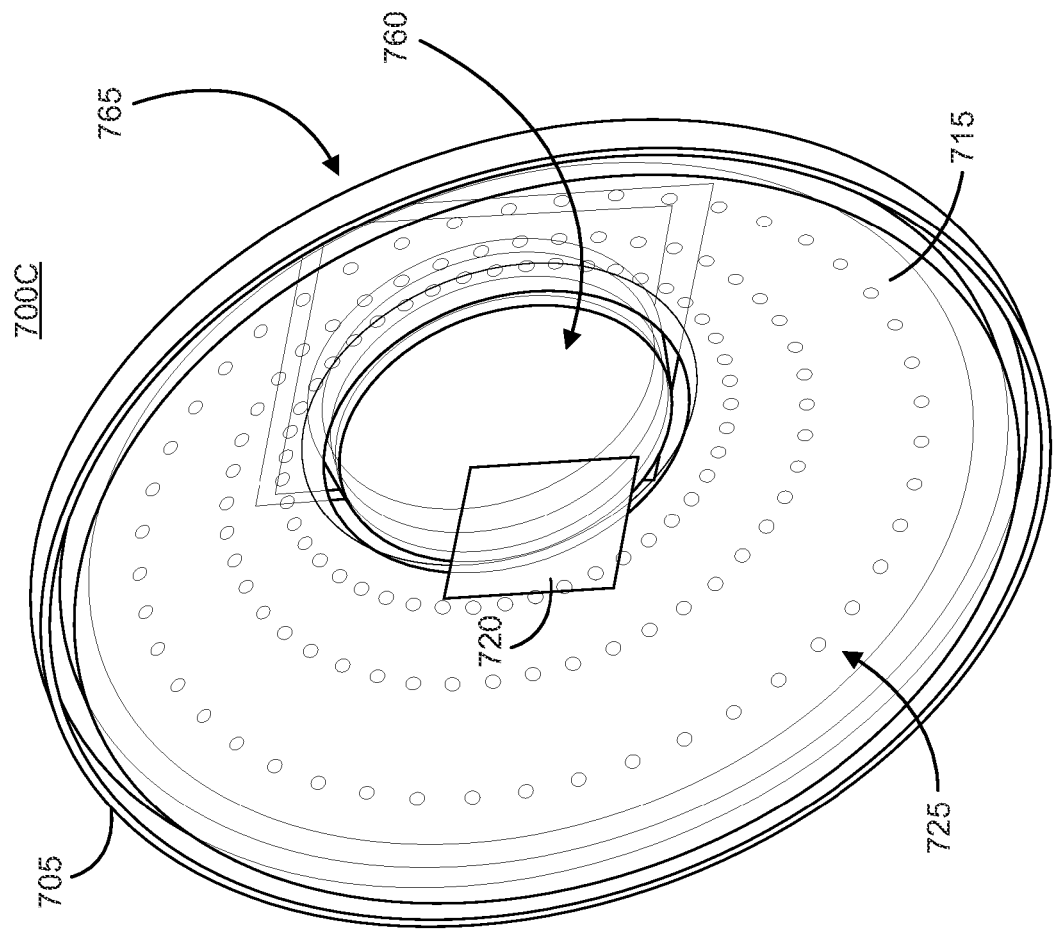
Figure 7B:
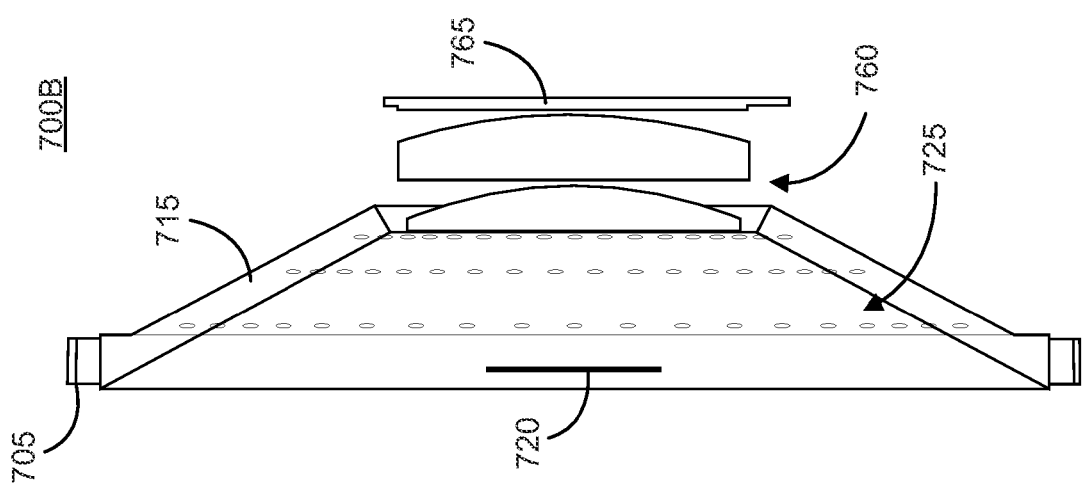

FIGS. 7A-7C illustrate various views 700A-700C of a conical waveguide configuration using a planar waveguide profile for improved peripheral fields of view (FOV), according to an example. A conical waveguide configuration 715 having a cross section with a planar waveguide profile similar to that of FIG. 4A or with a curved waveguide profile similar to that of FIG. 4B may be provided. As shown, the conical waveguide configuration 715 may have a cross section with the planar waveguide profile similar to that of FIG. 4A. The conical waveguide configuration 715 may include circular discrete elliptical mirrors 725. A curved or array display 705 may also be provided around an edge of the conical waveguide configuration. Although not explicitly shown in views 700A-700C, a microlens strip (MLS) may be provided between the display 705 and conical waveguide configuration 715. The microlens strip (MLS) may be used for collimation or other related function of visual data or information transmitted from the curved or array display 705 to the conical waveguide configuration 715. Although central optics 760 are depicted as pancake optics in these views 700A-700C, it should be appreciated that other types of optical components may be used for the central optics, such as waveguide optics (e.g., those described herein), Fresnel optics, etc.

It should be appreciated that the conical waveguide configuration 715 as shown herein may be provided in a direction orthogonal to a direction for pupil expansion. The benefits and advantages of using such a conical waveguide configuration 715 in this way may not only provide a more compact form factor (e.g., less than approximately 10 mm) relative to conventional headsets, a conical waveguide configuration 715 may also be more seamless with central optics and remove undesirable seam lines typically associated with tiled optics of other conventional systems and headsets. Furthermore, the conical waveguide configuration 715 may be partial or full. In a full configuration, the conical waveguide configuration 715, like that shown in view 700C, may revolve 360° and thereby provide larger field of view (FOV).

The shape of human field of view (FOV) is quite large and is of a unique shape. Although a human peripheral field of view (FOV) can be generally described as a crescent-like shape, it does not exactly have that shape. In some examples, the conical waveguide configuration 715 described herein may be able to provide tiled optics that offer a peripheral field of view (FOV) that comes relatively close to that of a human peripheral field of view (FOV).

Figure 8:
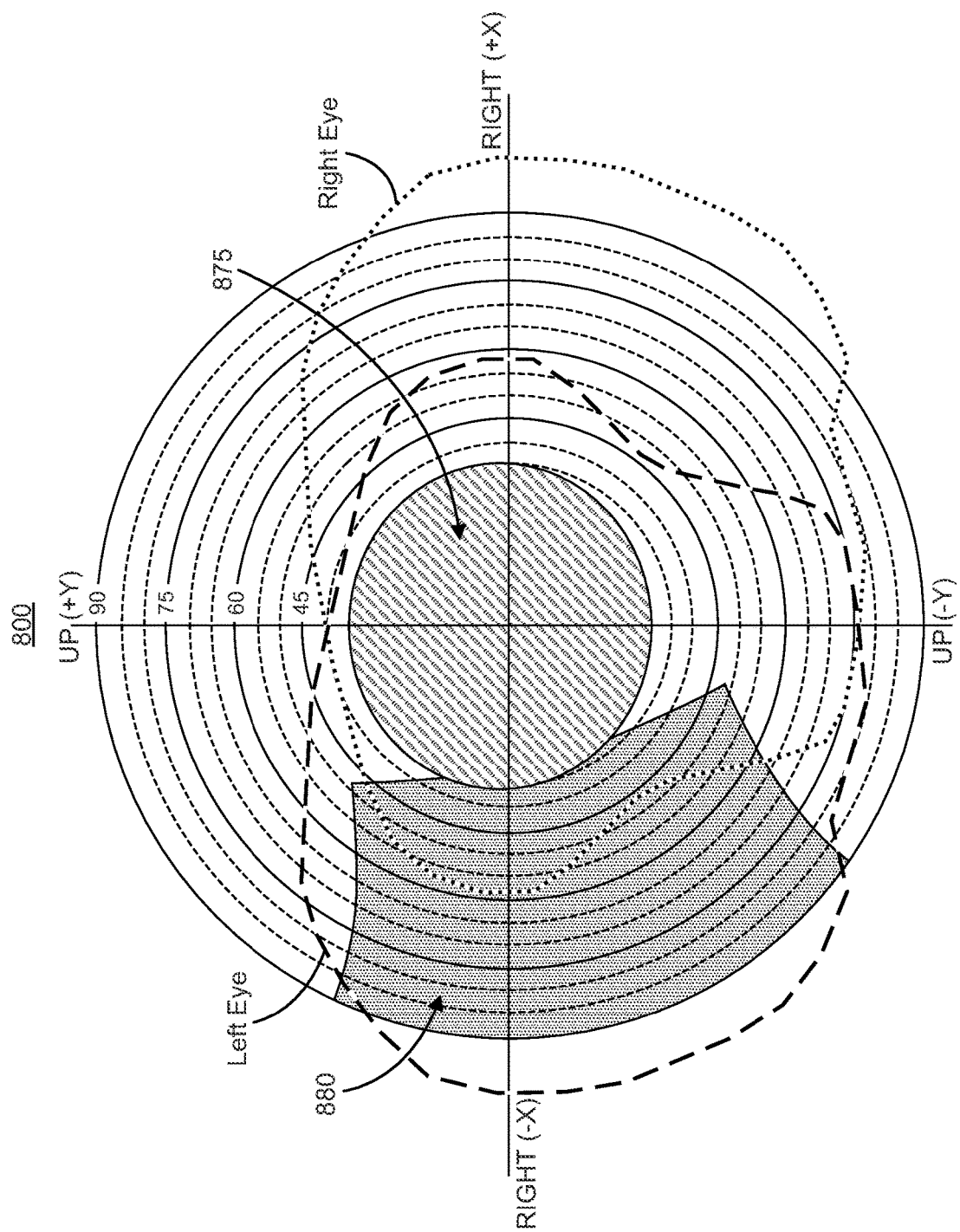
FIG. 8 illustrates a diagram representative of central and peripheral fields of view (FOV) using the conical waveguide configuration of FIGS. 7A-7C, according to an example.

FIG. 8 illustrates a diagram 800 representative of central and peripheral fields of view (FOV) using the conical waveguide configuration of FIGS. 7A-7C, according to an example. As shown, the human field of view (FOV) of the right eye and the left eye or shown by the dotted and dashed lines, respectively. Central optics may provide central field of view (FOV) 875 and the conical waveguide configuration 715 with a planar waveguide profile (partial version) may provide peripheral field of view (FOV) 880. The peripheral field of view (FOV) 880 provided by the conical waveguide configuration 715 with a planar waveguide profile, as shown, may provide visual coverage that is substantially close to human peripheral field of view (FOV) in the left eye. A full conical waveguide configuration 715 with a planar waveguide profile would provide peripheral field of view (FOV) coverage to the right eye as well as other areas, and with reduced or minimum black seams found in conventional systems that use tiling optics.

Example of Stacked Waveguides

Figure 9B:
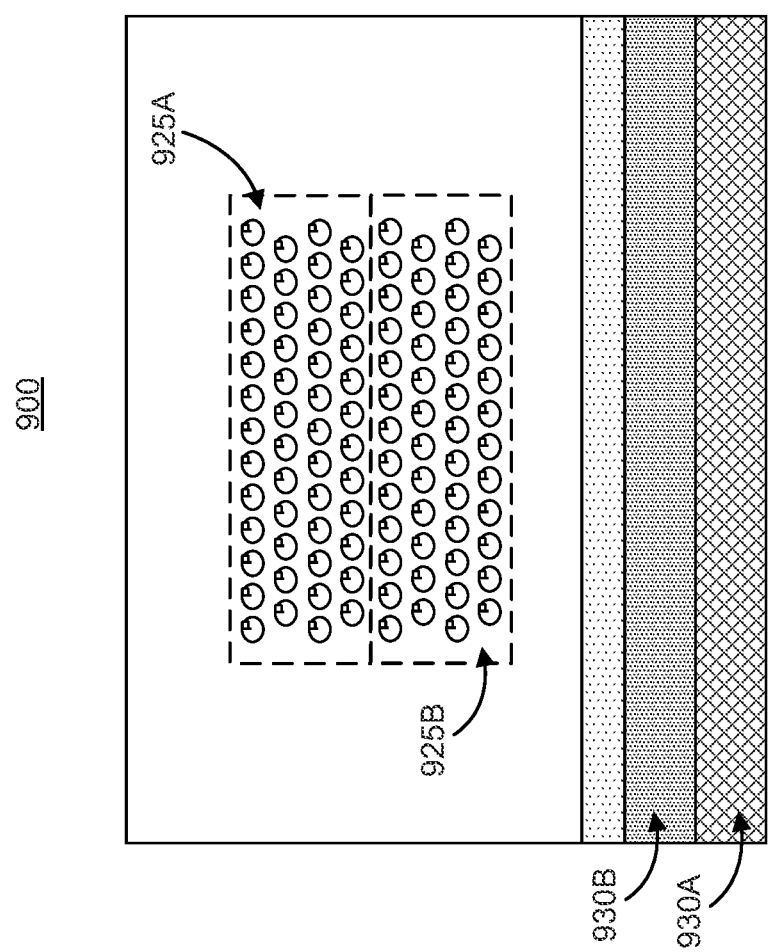

FIGS. 9A-9B illustrate a stacked waveguide configuration 900, according to an example. FIG. 9A illustrates a side view of the stacked waveguide configuration 900, according to an example. As shown, a first planar optical waveguide 915A may be stacked by a second planar optical waveguide 915B to form a stacked waveguide configuration 900. The stacked waveguide configuration 900 may include a display 905 and one or more collimator optics 915, and each of the planar optical waveguides 915A and 915B may each include a discrete elliptical mirror array 925A and 925B, respectively. Similar to FIG. 4A, the display 405 may provide visual content to a user, but that visual content may first traverse through the one or more collimator optics 915 and through the stacked waveguide configuration 900 of planar optical waveguides 915A and 915B before hitting an eye pupil (or an eye box) (not shown). In some examples, the display 405 may include any flat or curved panel display, scanning engines, and/or any other source that provides visual data or information. The display 905 may be a simple display or multiple displays. The one or more collimator optics 415 may include any variety of collimator optics, such as microlenses or element to collimate visual data or information (e.g., microlens strip (MLS) or microlens array (MLA)).

Although the stacked waveguide configuration 900 is shown with only two planar optical waveguides 915A and 915B, it should be appreciated that any number of similarly-shaped waveguides (planar, curved, or otherwise) may be stacked. It should be appreciated that a stacked waveguide configuration described here may support different fields of view (FOV) and/or various eyebox regions. Furthermore, each waveguide of the stacked configuration may be provided with different polarizations and/or time-multiplexing one in one piece. For example, polarization multiplexing and wavelength multiplexing may be achieved using a stacked waveguide configuration as described herein. Using multiplexing (PBS) in a geometric waveguide, for example, may help and improve efficiency and uniformity, not to mention ghost reduction. For example, if the discrete elliptical mirrors are polarization-selective (i.e., reflective polarizers), then two waveguides configured to emit orthogonal polarization states may do so without interference (e.g., without out-couplers blocking emission from the lower waveguide). Similarly, out-couplers may be configured to reflect narrow wavelength bands. Furthermore, OLEDs may be single color. In order to make full RGB color possible, dichroic mirrors and/or beam splitters may be used to provide a full RGB color spectrum. Accordingly, when compared with a single substrate or single (non-stacked) waveguide, the stacked waveguide configuration described herein may support larger fields of view (FOV) or eyebox with higher efficiency and less ghost. By either splitting each portion into several different substrates and designing each of the stacked waveguides separately, or by having mixed groups of in- or out-coupler for each portion, but integrated into a single stacked waveguide configuration, these benefits and advantages may be achieved.

FIG. 9B illustrates a top view of the stacked waveguide configuration 900, according to an example. Although polarization multiplexing may be shown in various configurations, an example for polarization multiplexing may be illustrated in this view. In some examples, there may be one display with upper/bottom region emitting orthogonal polarization light, or two micro-displays that have different polarization output. Light polarization states may then be coupled out by two separate groups of out-couplers, as shown, which may have different polarization selectivity reflective components (e.g., orthogonal reflective polarizer). This configuration may therefore ensure that rays from the bottom of the display can only be coupled out by discrete elliptical mirror array 925B closer to the in-coupler and rays from the top of the display only coupled out by the second discrete elliptical mirror array 925A. This may help to avoid a potential "ghost" path from polarization area 930A to couple through discrete elliptical mirror array 925A, and at the same time, avoid light loss for the polarization area 930B that would be coupled out earlier if light hits the discrete elliptical mirror array 925B before reaching the discrete elliptical mirror array 925A.

Although polarization multiplexing is shown in the stacked configuration herein, it should be appreciated that such techniques may be used in other configurations as well. For instance, in some examples, the discrete elliptical mirror arrays may be provided in just one of the stacked waveguides and utilize polarization techniques to reduce or eliminate cross-talk between two parts of discrete elliptical mirror arrays, as if they were in two separate substrates. In this way, polarization may help create a sense of "invisibility" and function as if they are two separate substrates.

Figure 10A:
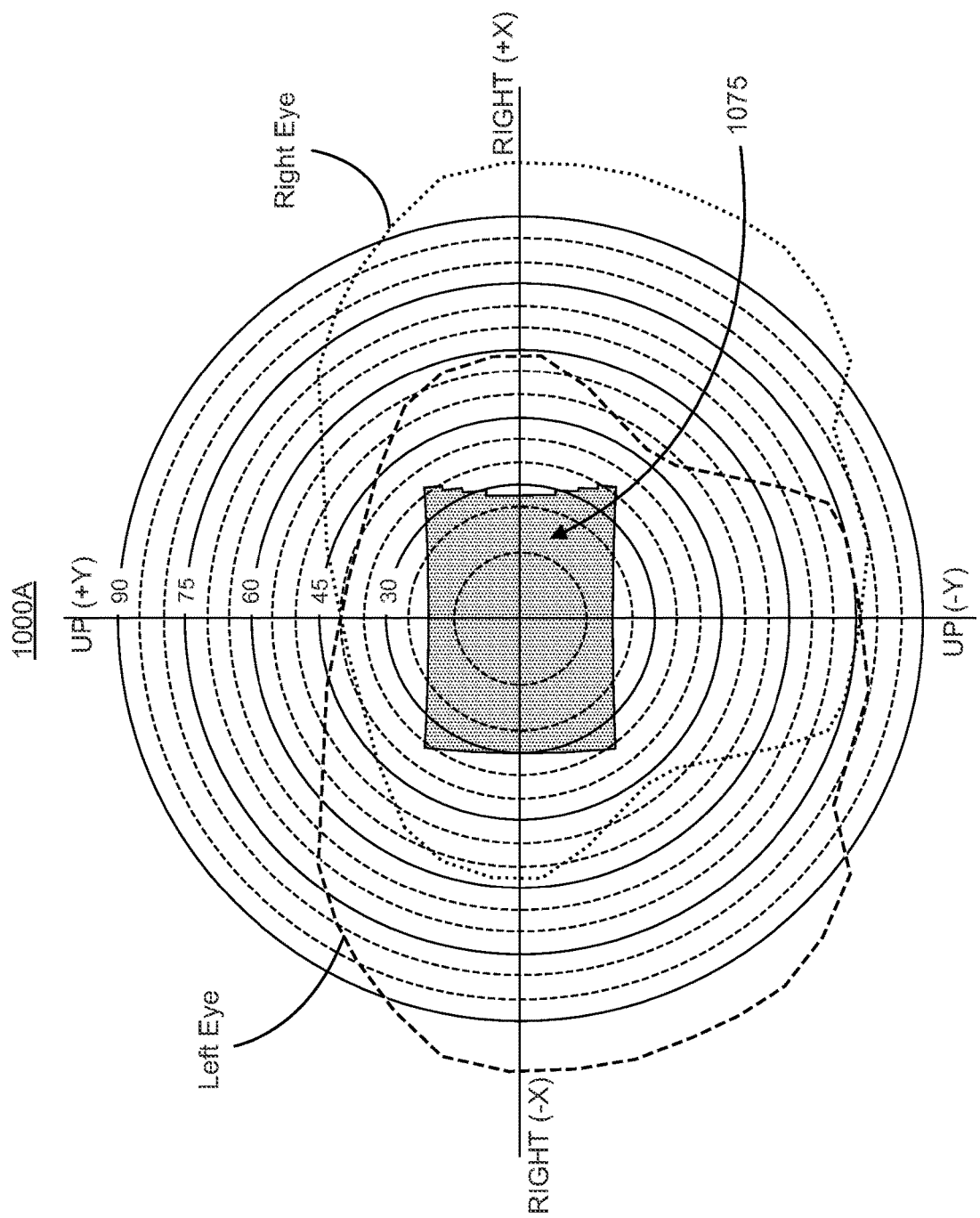

FIGS. 10A-10B illustrate diagrams 1000A-1000B representative of central and peripheral fields of view (FOV) using the stacked waveguide configuration 900 of FIGS. 9A-9B, according to an example. It should be appreciated that the discrete elliptical mirrors 925A may be further away from a center line of sight, while a center for the discrete elliptical mirrors 925B may be aligned with the eye line of sight. The display 905 may be in one piece, or two separate pieces with different angle to the in-coupler, or the in-coupler wedge angle, discrete elliptical mirror angle may be different for the two waveguides 915A and 915B, so that when images from the display 905 are coupled into the waveguide separately, the two waveguides 915A and 915B can support different fields of view (FOV). This configuration not only supports larger fields of view (FOV) by tiling two substrates, but may also provide additional benefits. For instance, as each of the waveguides 915A and 915B may support a portion of the overall field of view (FOV), there may be reduced or lessened "ghost" path or light loss for each portion. It should be appreciated that mirror location may not be drawn to scale and may be adjusted or configured, e.g., toward a central line of sight, to support the field of view (FOV), as described and shown in FIGS. 10A-10B.

Grin

It should be appreciated that in some examples, especially for curved or conical waveguide configurations, a graded index (GRIN) profile may be added as a shell lightguide to the surface of such waveguides. Because spherical or curved waveguides made of homogeneous materials, for example, may not necessarily be ideal for preserving conditions for light (e.g., mixing up optical signals), adding a graded index (GRIN) profile or layer may help better refract light and thereby preserve optical data and information.

Additional Information

The benefits and advantages of the waveguide confirmations described herein, may include, among other things, smaller forma factor, maximized see-through path, reduction or elimination of black seams associated with tiled optics, and improved central and peripheral fields of view (FOV) in headsets used in virtual reality (VR), augmented reality (AR), and/or mixed reality (MR) environments.

As mentioned above, there may be numerous ways to configure, provide, manufacture, or position the various optical, electrical, and/or mechanical components or elements of the examples described above. While examples described herein are directed to certain configurations as shown, it should be appreciated that any of the components described or mentioned herein may be altered, changed, replaced, or modified, in size, shape, and numbers, or material, depending on application or use case, and adjusted for desired resolution or optimal results. In this way, other electrical, thermal, mechanical and/or design advantages may also be obtained.

It should be appreciated that the apparatuses, systems, and methods described herein may facilitate more desirable headsets or visual results. It should also be appreciated that the apparatuses, systems, and methods, as described herein, may also include or communicate with other components not shown. For example, these may include external processors, counters, analyzers, computing devices, and other measuring devices or systems. In some examples, this may also include middleware (not shown) as well. Middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the headset.

Moreover, single components described herein may be provided as multiple components, and vice versa, to perform the functions and features described above. It should be appreciated that the components of the apparatus or system described herein may operate in partial or full capacity, or it may be removed entirely. It should also be appreciated that analytics and processing techniques described herein with respect to the waveguide configurations, for example, may also be performed partially or in full by these or other various components of the overall system or apparatus.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and/or interfaces, may be any number of optical, mechanical, electrical, hardware, network, or software components, circuits, elements, and interfaces that serves to facilitate communication, exchange, and analysis data between any number of or combination of equipment, protocol layers, or applications. For example, some of the components described herein may each include a network or communication interface to communicate with other servers, devices, components or network elements via a network or other communication protocol.

Although examples are directed to head-mounted displays (HMDs), it should be appreciated that the apparatuses, systems, and methods described herein may also be used in other various systems and other implementations. For example, these may include other various head-mounted systems, eyewear, wearable devices, etc. in any number of virtual reality (VR), augmented reality (AR), and/or mixed reality (MR) environments. In fact, there may be numerous applications in various optical communication scenarios.

It should be appreciated that the apparatuses, systems, and methods described herein may also be used to help provide, directly or indirectly, measurements for distance, angle, rotation, speed, position, wavelength, transmissivity, and/or other related optical measurements. For example, the systems and methods described herein may allow for a higher resolution optical resolution using an efficient and cost-effective design concept. With additional advantages that include higher resolution, lower number of optical elements, more efficient processing techniques, cost-effective configurations, and smaller or more compact form factor, the apparatuses, systems, and methods described herein may be beneficial in many original equipment manufacturer (OEM) applications, where they may be readily integrated into various and existing equipment, systems, instruments, or other systems and methods. The apparatuses, systems, and methods described herein may provide mechanical simplicity and adaptability to small or large headsets. Ultimately, the apparatuses, systems, and methods described herein may increase resolution, minimize adverse effects of traditional systems, and improve visual efficiencies.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A head-mounted display (HMD), comprising:
   a display element to display visual content;
   a collimator optic, adjacent to the display element, to collimate the visual content; and
   an optical waveguide comprising a substrate and at least one array of elliptical mirrors within the substrate,
   wherein the optical waveguide is adjacent to the collimator optic to receive the collimated visual content from the collimator optic and guide the collimated visual content through the elliptical mirrors toward eyes of a user of the head-mounted display (HMD).

2. The head-mounted display (HMD) of claim 1, wherein the optical waveguide is part of central optics of the head-mounted display (HMD), the optical waveguide comprising at least one of a planar waveguide profile or a curved waveguide profile.

3. The head-mounted display (HMD) of claim 1, wherein the optical waveguide is part of peripheral optics of the head-mounted display (HMD), the optical waveguide being a conical waveguide having at least one of a planar waveguide profile or a curved waveguide profile.

4. The head-mounted display (HMD) of claim 1, wherein the at least one array of the elliptical mirrors within the substrate of the optical waveguide comprises: a plurality of rows of the elliptical mirrors within the substrate of the optical waveguide.

5. The head-mounted display (HMD) of claim 1, wherein the optical waveguide is in a stacked waveguide configuration.

6. The head-mounted display (HMD) of claim 1, wherein the optical waveguide comprises a grade index (GRIN) layer.

7. The head-mounted display (HMD) of claim 1, wherein the display element is flat, curved, or in an array, the display element comprising one of a liquid crystal display (LCD), a light emitting diode (LED) display, an organic light emitting diode (OLED) display, an active-matrix organic light-emitting diode (AMOLED) display, or a micro light emitting diode (micro-LED) display.

8. The head-mounted display (HMD) of claim 1, wherein the collimator optic comprises at least one of a microlens array (MLA) or microlens strip (MLS).

9. The head-mounted display (HMD) of claim 1, wherein the optical waveguide comprises a width and a length, and an entrance face of the optical waveguide is located on the width of the optical waveguide and has a specific angle with respect to the length of the optical waveguide.

10. An optical assembly, comprising:
    a display element to display visual content;
    an optical waveguide comprising at least one array of elliptical mirrors; and
    a collimator optic positioned between the display element and the optical waveguide,
    wherein light of the visual content on the display element traverses through the collimator optic and through the elliptical mirrors of the optical waveguide to present the visual content to a user.

11. The optical assembly of claim 10, wherein the optical waveguide comprises a planar waveguide profile or a curved waveguide profile.

12. The optical assembly of claim 10, wherein the at least one array of the elliptical mirrors comprises: a plurality of rows of the elliptical mirrors within the optical waveguide.

13. The optical assembly of claim 10, wherein the optical waveguide is in a stacked waveguide configuration.

14. The optical assembly of claim 10, wherein the optical waveguide comprises a grade index (GRIN) layer.

15. The optical assembly of claim 10, the optical waveguide further comprising: a width and a length, and an entrance face of the optical waveguide is located on the width of the optical waveguide and has a specific angle with respect to the length of the optical waveguide.

16. The optical assembly of claim 15, wherein the specific angle of the entrance face of the optical waveguide is less than 90 degrees.

17. A head-mounted display (HMD), comprising:
- a display element to display visual content;
- a collimator optic, adjacent to the display element, to collimate the visual content; and
- an optical waveguide comprising at least one array of elliptical mirrors,
- wherein light of the visual content on the display element traverses through the collimator optic and through the elliptical mirrors of the optical waveguide to present the visual content to a user of the head-mounted display (HMD), and
- wherein the optical waveguide comprises an entrance face located on a width of the optical waveguide and has a specific angle with respect to a length of the optical waveguide.

18. The head-mounted display (HMD) of claim 17, wherein the specific angle of the entrance face of the optical waveguide is less than 90 degrees.

19. The head-mounted display (HMD) of claim 17, wherein the optical waveguide comprises a grade index (GRIN) layer.

20. The head-mounted display (HMD) of claim 17, wherein the at least one array of the elliptical mirrors comprises: a plurality of rows of the elliptical mirrors within the optical waveguide.

* * * * *